Jan. 27, 1925.
J. W. WATSON
SPRING SHACKLE
Filed July 3, 1919
1,524,603
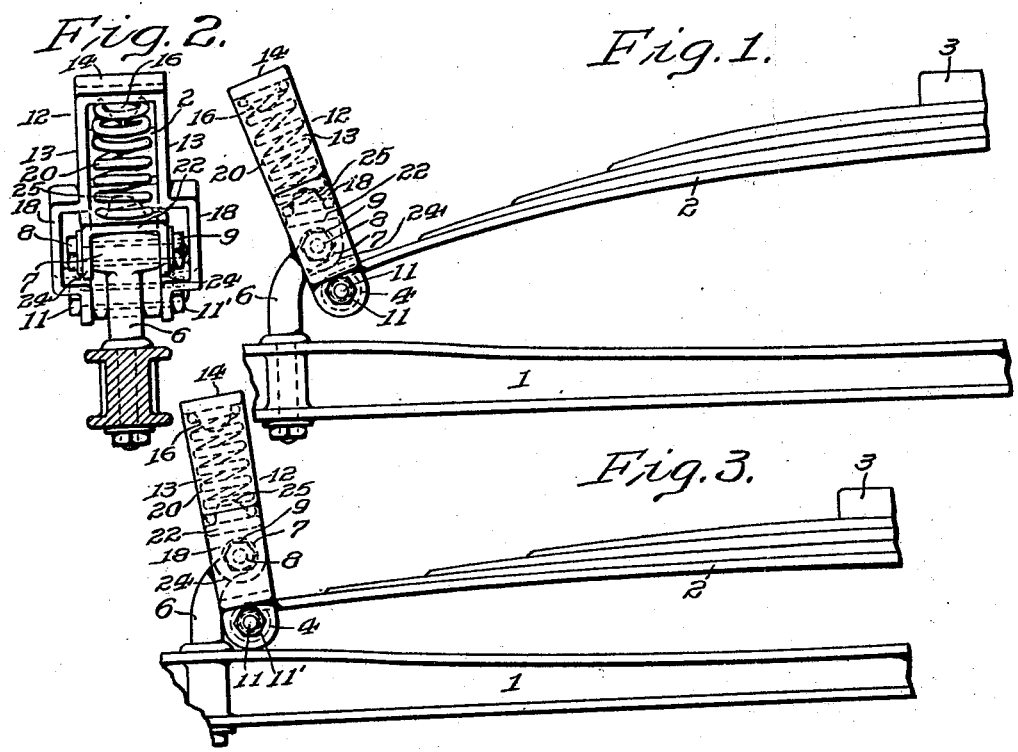
INVENTOR
John Warren Watson
WITNESS
ATTORNEYS Patented Jan. 27, 1925.

1,524,603

UNITED STATES PATENT OFFICE.

JOHN WARREN WATSON, OF WAYNE, PENNSYLVANIA.

SPRING SHACKLE.

Application filed July 3, 1919. Serial No. 308,556.

*To all whom it may concern:*

Be it known that I, JOHN WARREN WATSON, a citizen of the United States, and a resident of Wayne, in the county of Delaware, State of Pennsylvania, have invented certain new and useful Improvements in Spring Shackles, of which the following is a specification, reference being had to the accompanying drawing.

My invention relates to novel means for providing a connection or shackle between a vehicle spring and a relatively movable vehicle member.

A principal object of my invention is to provide a shackle or flexible connection, between a vehicle spring and a relatively movable vehicle member, which contains no bearings, bushings, or other parts which would require lubrication, and which would wear and become noisy in service.

Further objects of my invention are to provide a shackle or flexible connection between a vehicle spring and another vehicle member which is simple to construct, which will stand up satisfactorily in use, which may be easily installed and which, if desired, may be made interchangeable with spring shackles now in common use.

My invention may, if desired, and as is shown in the embodiments illustrated in Figures 1 to 6 inclusive, be so constructed as to not only serve its primary purpose of providing a spring shackle without wearing parts, but also serve to supplement the vehicle spring in absorbing shocks.

In the embodiments shown in Figures 1 to 6 inclusive, it will be noted that in addition to accommodating the horizontal movements of the end of the vehicle spring as said spring compresses and expands, the device in the embodiments above referred to, also accommodates vertical movements of the vehicle spring end. Thus, in the embodiments above referred to, the invention accommodates relative motion, between the vehicle spring end and another vehicle part, in four, or more, directions.

My invention further includes all of the other various novel objects and features of construction and arrangement hereinafter more definitely referred to and described.

While any suitable combination of elements or means may be employed in carrying out my invention I have, for the purpose of illustration, shown in the accompanying drawings, and will now proceed to describe, certain embodiments thereof.

Figure 1 is a view in elevation of one form of my invention showing the same as attached to a vehicle with the vehicle spring in normal position. Figure 2 is an end elevation thereof. Figure 3 is a view similar to Figure 1, but showing the parts substantially in the position assumed when the vehicle spring is compressed.

In the above drawings 1 is the vehicle axle; 2 is the vehicle spring relatively movable with respect thereto, and 3 a diagrammatic representation of the vehicle frame or body supported by the spring. The spring 2 is provided with an eye 4 and the axle with an upwardly extending and inwardly turned bracket 6 suitably rigidly secured thereto and provided adjacent its upper extremity with an aperture or eye 7 corresponding to the eye 4 of the spring and adapted for the reception of a bolt 8 carrying a nut 9, or other suitable means, by which one part of the shackle may be secured to the bracket. It will be understood that the eye 4 in the spring is similarly adapted for the reception of a bolt 11 carrying a nut 11′ or other suitable means, by which another part of the shackle may be secured to the spring. The several vehicle parts referred to above are of well-known form and construction, their specific details varying on different makes of vehicles.

My improved shackle is adapted for interposition between the bracket and the vehicle spring for the purpose of forming a yielding connection therebetween, and in the form of invention shown in Figs. 1 to 3, comprises a member or strap 12 having longitudinally extending sides 13 connected by a transversely extending portion 14, one end of the strap being open and the sides adjacent said end being provided with apertures adapted for the reception of the bolt 11 by means of which the strap may be immovably secured to the spring 2 so that no relative motion may occur between the strap and the spring. Positioned on the transverse member 14 and extending from the inner surface thereof, is a projection or knob 16 for a purpose to be hereinafter described. To afford sufficient clearance to permit the strap to pass the ends of bolt 8 during operation, the sides 13 may be offset as at 18 in any suitable manner.

Positioned within the strap and seated at one end over the projection 16 is a suitable coil spring 20 which extends towards the bracket 6 and is seated at its other end on a member or plate 22 provided with downwardly depending ears 24 fitting over the bracket and having apertures to permit the passage of the bolt 8 whereby the plate may be secured in rigid relation with the bracket in such manner as to prevent any relative motion between the parts. At the center of the plate may be conveniently provided an upwardly extending projection or knob 25, corresponding to projection 16, adapted to enter the spring 20, which, through its engagement with the projections 16 and 25, is prevented from slipping out of its assembled position within the strap.

With the parts constructed as described, and assembled as shown in Figs. 1 and 2, the spring 20 forms a flexible connection between the vehicle spring and the bracket 6, and as the strap is incapable of relative movement with respect to the vehicle spring and as the plate is similarly incapable of relative motion with respect to the bracket, the necessary play required to permit the vehicle spring to approach and recede from the bracket as the former is flexed is afforded solely by the warping of the spring 20, the parts when the vehicle spring is under maximum compression assuming substantially the position shown in Fig. 3.

It will be understood that the spring 20 is constructed in such manner as to adequately support the end of spring 2 and to maintain it out of contact with the axle. Furthermore, it will be understood that certain parts of the shackle are in some manner conveniently immovably secured to the vehicle spring and to a vehicle element relatively movable with respect thereto, whereby all wear, resulting looseness and consequent noise at these points is eliminated.

Therefore, while I have herein shown and described one form of my invention and have illustrated it in connection with a well-known form of vehicle construction, I do not thereby desire or intend to limit myself solely thereto, as the specific form and arrangement of the various parts may be modified, as desired, to adapt the invention for various conditions and loads to be carried, and to adapt it for attachment to various types of vehicles without departing from the spirit and scope of the invention as defined in the appended claims.

Having thus described my invention, I claim and desire to protect by Letters Patent of the United States:

1. The combination of two members; a yoke connected to one member; with a coil spring mounted between said yoke and the second member and movable by the application of a load to one of the members from a laterally warped condition toward a substantially straight condition.

2. The combination with a vehicle spring and another vehicle part of a yoke non-rotatably connected to one of said parts; a spring seat rigidly mounted on the yoke; a second spring seat rigidly mounted on the other of said parts; and a helical spring mounted between said seats and free to change its form laterally as load is applied to the vehicle spring.

3. The combination with a vehicle spring and another vehicle part of a yoke non-rotatably connected to said spring, a second yoke non-rotatably connected to said vehicle part, and a coil spring mounted between said yokes and movable by the application of a load from a laterally warped condition toward a substantially straight condition.

4. The combination with a vehicle spring and another vehicle part of a yoke non-rotatably connected to said spring, a spring seat rigidly mounted on said yoke, a second yoke non-rotatably connected to the vehicle part, a spring seat rigidly mounted on said second yoke, and a helical spring mounted between said seats and free to change its form laterally as load is applied to the vehicle spring.

5. The combination with a vehicle part and a vehicle spring of an inverted U-shaped yoke non-rotatably connected to the vehicle part, a second inverted U-shaped yoke non-rotatably connected to the vehicle spring and adapted to straddle the first mentioned yoke, and a coil spring positioned between the upper side of the first yoke and the inner side of the second yoke and movable by the application of a load from a laterally warped condition to a substantially straight condition.

In witness whereof, I have hereunto set my hand this first day of July, A. D. 1919.

JOHN WARREN WATSON.